United States Patent
Noda

(10) Patent No.: US 6,825,944 B1
(45) Date of Patent: Nov. 30, 2004

(54) INFORMATION PROCESSING APPARATUS AND PRINTING CONTROL METHOD

(75) Inventor: Akihiko Noda, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/440,066

(22) Filed: Nov. 15, 1999

(30) Foreign Application Priority Data

Nov. 18, 1998 (JP) .......................................... 10-328575

(51) Int. Cl.[7] .......................................... G06F 15/00
(52) U.S. Cl. ..................................... 358/1.15; 358/1.9
(58) Field of Search ..................... 358/434, 1.9, 1.15, 358/1.14, 406, 518, 523; 399/75, 39, 8

(56) References Cited

U.S. PATENT DOCUMENTS

| | | | |
|---|---|---|---|
| 5,257,069 A | * 10/1993 | Hirata et al. .................... | 399/8 |
| 5,933,676 A | * 8/1999 | Ohno ............................ | 399/8 |
| 5,950,036 A | * 9/1999 | Konishi ......................... | 399/8 |
| 5,970,216 A | * 10/1999 | Tanio et al. ................ | 358/1.13 |
| 6,023,344 A | * 2/2000 | Yabe ........................... | 358/296 |
| 6,046,820 A | 4/2000 | Konishi ....................... | 358/1.9 |
| 6,160,968 A | * 12/2000 | Noda ............................. | 399/8 |
| 6,172,771 B1 | * 1/2001 | Ikeda et al. ................. | 358/406 |
| 6,246,486 B1 | * 6/2001 | Takahashi .................. | 358/1.13 |
| 6,297,873 B1 | * 10/2001 | Furuya ........................ | 355/40 |

FOREIGN PATENT DOCUMENTS

| | | |
|---|---|---|
| EP | 0 863 458 A2 | 9/1998 |
| JP | 7-200195 | 8/1995 |
| JP | 10-181102 | 7/1998 |
| JP | 10-244705 | 9/1998 |

* cited by examiner

*Primary Examiner*—Mark Wallerson
(74) *Attorney, Agent, or Firm*—Fitzpatrick, Cella, Harper & Scinto

(57) ABSTRACT

The printer driver, a program to be executed by the host, upon receiving a print request, requests the printer to send the calibration information, stores the calibration information transferred from the printer and generates a correction table based on the calibration information stored. By referring the correction table the printer driver corrects the print data to generate a print job of binary data and sends the print job to the printer. In a configuration in which the host corrects the print data and sends the corrected print data to the printer, efficient and precise calibration can be carried out without the user taking much time and trouble.

15 Claims, 23 Drawing Sheets

CALIBRATION INFORMATION

| ID | ACTUAL DENSITY VALUE |
|---|---|
|  | (INPUT VALUE FROM PRINTER) |
| I1 | D1 |
| I2 | D2 |
| I3 | D3 |
| I4 | D4 |
| I5 | D5 |

FIG.12

CORRECTION TABLE

| ID | LOGICAL DENSITY VALUE (OUTPUT VALUE TO PRINTER) | ACTUAL DENSITY VALUE (INPUT VALUE FROM PRINTER) | DENSITY CORRECTION VALUE |
|---|---|---|---|
| I1 | 10% | D1 | 10/D1 |
| I2 | 30% | D2 | 30/D2 |
| I3 | 50% | D3 | 50/D3 |
| I4 | 70% | D4 | 70/D4 |
| I5 | 100% | D5 | 100/D5 |

FIG.14

INFORMATION PROCESSING APPARATUS AND PRINTING CONTROL METHOD

This application is based on Patent Application No. 10-328575 (1998) filed on Nov. 18, 1998 in Japan, the content of which is incorporated hereinto by reference.

BACKGROUND OF THE INVENTION

1. Field of the Invention

The present invention relates to an information processing apparatus and a printing control method and more specifically to a calibration performed on a printing apparatus.

2. Description of the Prior Art

A printing apparatus is widely used as a device for outputting image information or the like in an information processing system. As such printing apparatus, the printing apparatus (also referred to as a "printer" bellow) of electrophotographic type which uses a laser beam, forms a visible image by fixing toner to a sheet. Also, the printing apparatus of ink jet type, such as bubble jet type, ejects ink onto the sheet to form a visible image. This printing process or printing mechanism is becoming increasingly complicated as the printer's level of resolution has increased and color images have come to be produced in recent years.

In such a printer, variations in environment condition and wear of parts of the printer change electric and mechanical states of the printer at time of forming the visible image, which in turn may change the visible image being formed. Typical examples of such changes of the visible image include variations in density or a gray scale of a printed image or variations in a tone of a color image.

To deal with such changes in printed images, correction processing on a γ correction table, i.e., a process called calibration, has been performed conventionally. This calibration is carried out as follows in the information processing system including a host device and the printer.

In a first example where the host device sends print data in the form of a PDL print job to the printer, the host device (also simply referred to as a "host" bellow) does not perform the calibration but instead the printer individually performs the calibration. More specifically, a controller of the printer accepts a calibration request from an engine of the printer at a predetermined timing and performs the calibration for updating the correction table according to this request. Then, when it receives the print job, the controller corrects the image data (print job) by using the updated correction table.

In a second example where the host sends print data in the form of a multivalued print job, e.g., a binary print job, to the printer which uses the print data as is for printing, the calibration is done by the host. More specifically, the host causes the printer to print a predetermined patch. Then, measurement for the print result is carried out by a color measuring device and the result of the measurement is inputted to the host to perform the calibration for generating correction data. Thus, the host retains this generated correction data and reflects it on the print data (print job) to correct the print data. Other known methods for generating the correction data include: a method in which the calibration is performed by the printer, correction values or the result of the calibration is printed out, and the correction values are sent to the host so that the correction values can be utilized for the correction of the print data; and a method in which the host quantitatively determines the tendency of quality degradation by measuring the density in advance for each condition, including the number of printed sheets and the number of print colors, and the quantitative tendency is used as the correction data.

In the first example stated above, the controller of the printer performs the calibration upon reception of the request from the engine for every predetermined number of sheets printed. Thus, the calibration is carried out periodically in a print data transmission mode such as one performed in the first example. Therefore, the printing is done based on an appropriate calibration result, causing almost no degradation in print quality, with the result that the actual printed result may almost equal a desired printed result in many cases as shown in FIG. 1A.

In one configuration of the second example where the calibration or the correction based on the calibration is not automatically performed, if the calibration is not executed especially, a change in the printer state may be caused and the actual printed result may differ from the desired printed result as shown in FIG. 1B. For such case, the calibration needs to be performed at an appropriate timing, which in turn makes it necessary to generate correction data for the calibration. However, the configuration where the correction data is measured by the color measuring device and the result of measurement is inputted to the host, or where the calibration information is obtained and printed by the engine of the printer and the printed correction values are entered to the host, has a problem that the processing for making measurements and entering data to the host come to be complicated for the user. Further, because the state of the printer changes continuously, it is desired, strictly speaking, that the correction data be generated each time the printing is performed. This, however, is not only inefficient in terms of input processing on the part of the user but not economical because the output other than those required for the intended purpose of printing is repeated.

In the configuration that the predetermined quantitative tendency of quality degradation is used as the correction data, an operating condition of the printer often cannot be identified at the time when the correction data is determined. This makes it impossible to perform accurate calibration.

SUMMARY OF THE INVENTION

An object of the present invention is to provide an information processing apparatus and a printing control method which enable a precise and efficient calibration without requiring an user of a printing apparatus to spend a considerable time performing calibration procedure even in a system where a host device performs correction on print data and sends the corrected print data to the printing apparatus.

In a first aspect of the present invention, there is provided an information processing apparatus which can be connected to a printing apparatus in a way that allows a bidirectional communication, the printing apparatus being adapted to generate calibration information used to correct print data and capable of supplying the calibration information in response to a request for the calibration information, the information processing apparatus comprising:

an obtaining means for, in response to a request for printing, requesting the printing apparatus to send the calibration information and obtaining the calibration information from the printing apparatus;

a generating means for generating a print job in which print data is corrected based on the calibration information obtained by the obtaining means; and a transfer means for transferring the print job generated by the generating means to the printing apparatus.

In a second aspect of the present invention, there is provided an information processing apparatus which can be connected to a printing apparatus in a way that allows a bidirectional communication, the printing apparatus being adapted to generate calibration information used to correct print data and capable of supplying the calibration information in response to a request for the calibration information, the information processing apparatus comprising:

an obtaining means for, after printing is request, requesting the printing apparatus to send the calibration information, at predetermined intervals and obtaining the calibration information from the printing apparatus;

a generating means for generating a print job in which print data is corrected based on the latest one of the calibration information obtained at predetermined intervals; and a transfer means for transferring the generated print job to the printing apparatus.

In a third aspect of the present invention, there is provided a printing control method used in an information processing apparatus which can be connected to a printing apparatus in a way that allows a bidirectional communication, the printing apparatus being adapted to generate calibration information used to correct print data and capable of supplying the calibration information in response to a request for the calibration information, the printing control method comprising the steps of:

in response to a request for printing, requesting the printing apparatus to send the calibration information and obtaining the calibration information from the printing apparatus;

generating a print job in which print data is corrected based on the calibration information obtained by the obtaining step; and transferring the print job generated by the generating step to the printing apparatus.

In a fourth aspect of the present invention, there is provided a printing control method used in an information processing apparatus which can be connected to a printing apparatus in a way that allows a bidirectional communication, the printing apparatus being adapted to generate calibration information used to correct print data and capable of supplying the calibration information in response to a request for the calibration information, the printing control method comprising the steps of:

after printing is request, requesting the printing apparatus to send the calibration information, at predetermined intervals and obtaining the calibration information from the printing apparatus;

generating a print job in which print data is corrected based on the latest one of the calibration information obtained at predetermined intervals; and transferring the generated print job to the printing apparatus.

In a system in which the information processing apparatus as a host sends a print job to a printing apparatus to control a printing operation of the printing apparatus, in the case that the print data to be transmitted to the printing apparatus is in the form of binary data that is used as is by the printing apparatus, the configuration described above allows the information processing apparatus, when preparing the print job, to require the printing apparatus to send the calibration information to the information processing apparatus and correct the print data based on the calibration information obtained, thus making it possible for the host to automatically perform the correction based on the calibration information at generating the print job.

The above and other objects, effects, features and advantages of the present invention will become more apparent from the following description of embodiments thereof taken in conjunction with the accompanying drawings.

BRIEF DESCRIPTION OF THE DRAWINGS

FIG. 12 is a diagram conceptually showing the calibration information of the embodiment of the present invention;

FIG. 14 is a diagram conceptually showing a correction table generated based on the calibration information in the embodiment of the present invention;

DESCRIPTION OF THE PREFERRED EMBODIMENTS

Now, embodiments of the present invention will be described in detail by referring to the accompanying drawings.

Figure 1A:
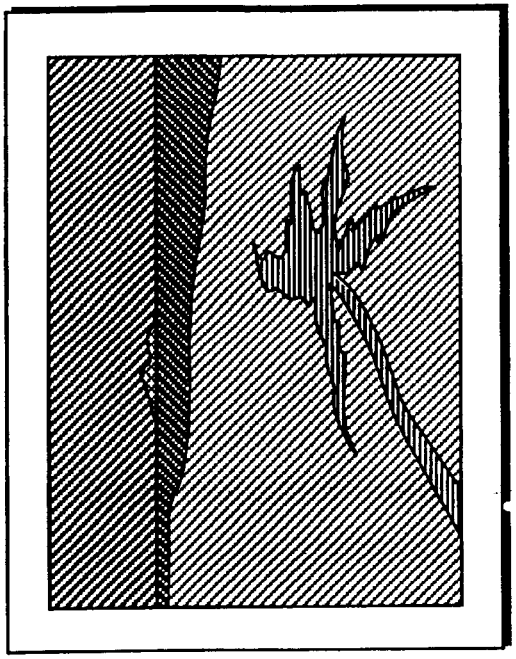
FIGS. 1A and 1B are views showing respective printed results obtained according to different forms of print data for comparison when these print data are sent from a host to a printer.
Figure 1A:
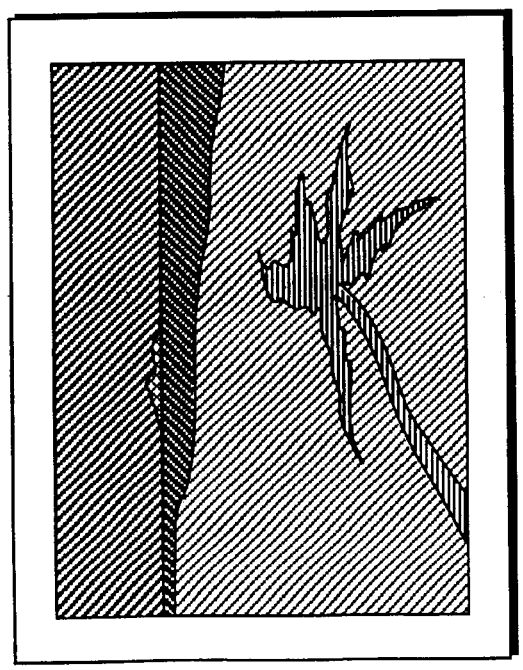
Figure 1B:
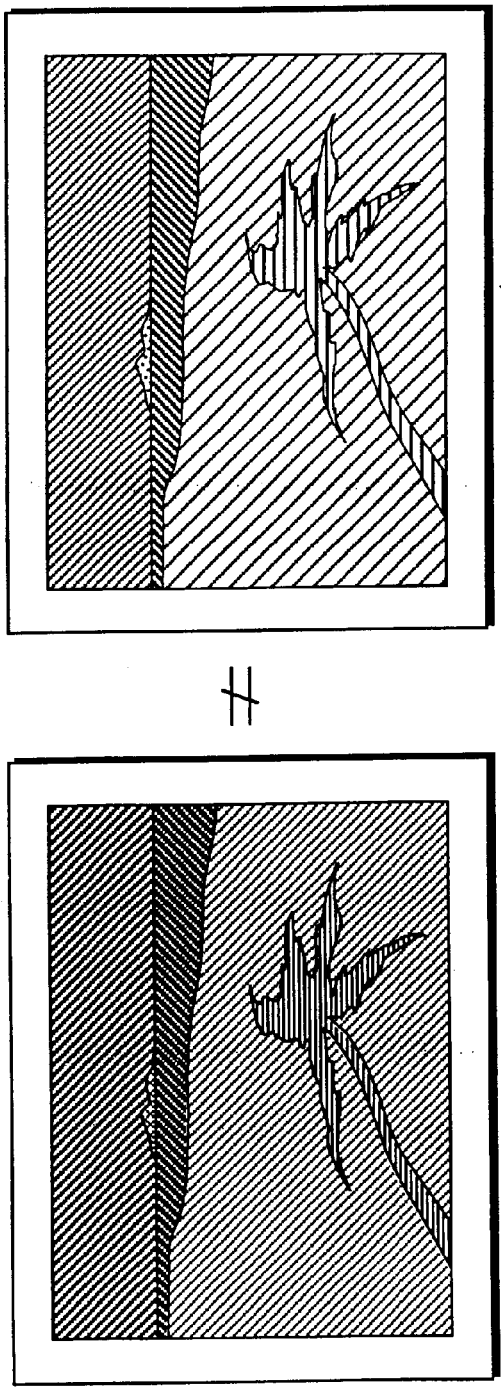
Figure 2:
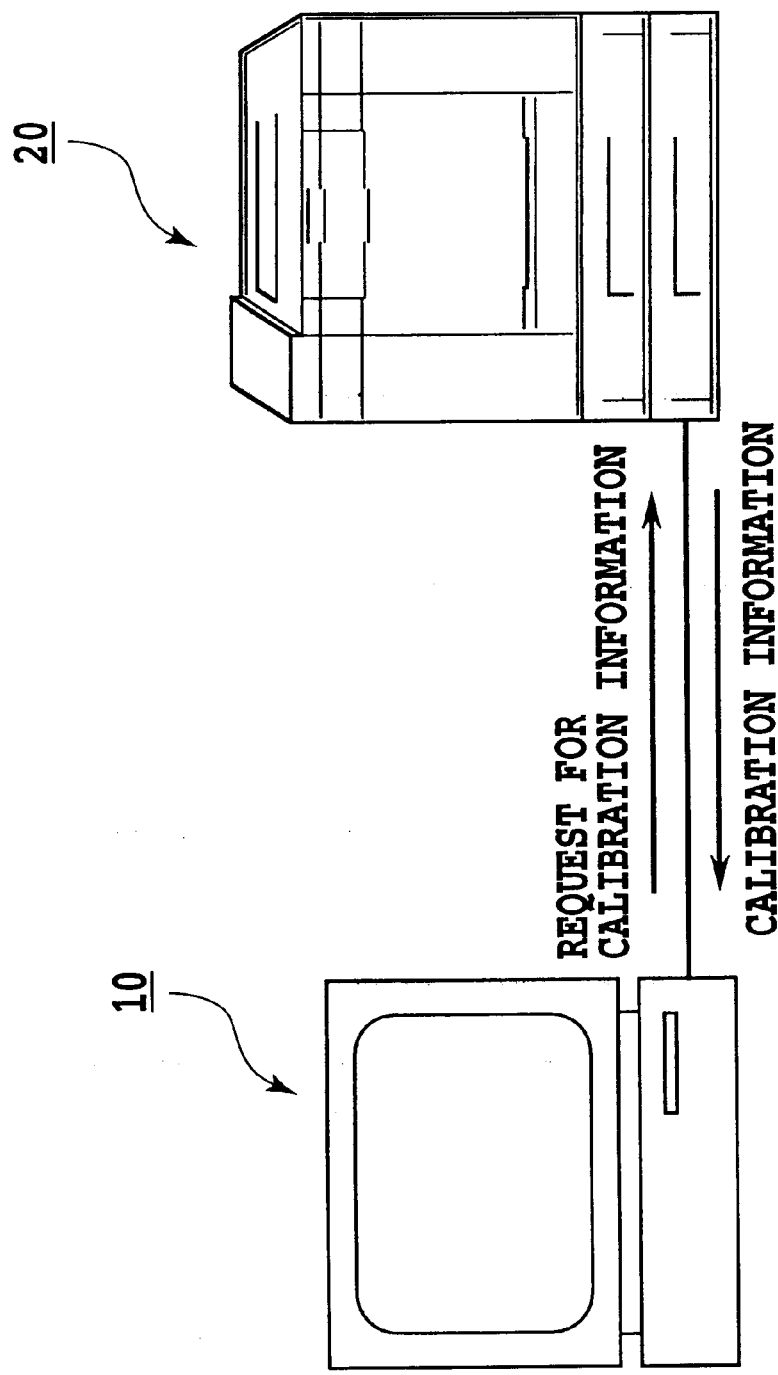
FIG. 2 is a diagram showing a basic configuration of an information processing system as one embodiment of the present invention.
Figure 3:
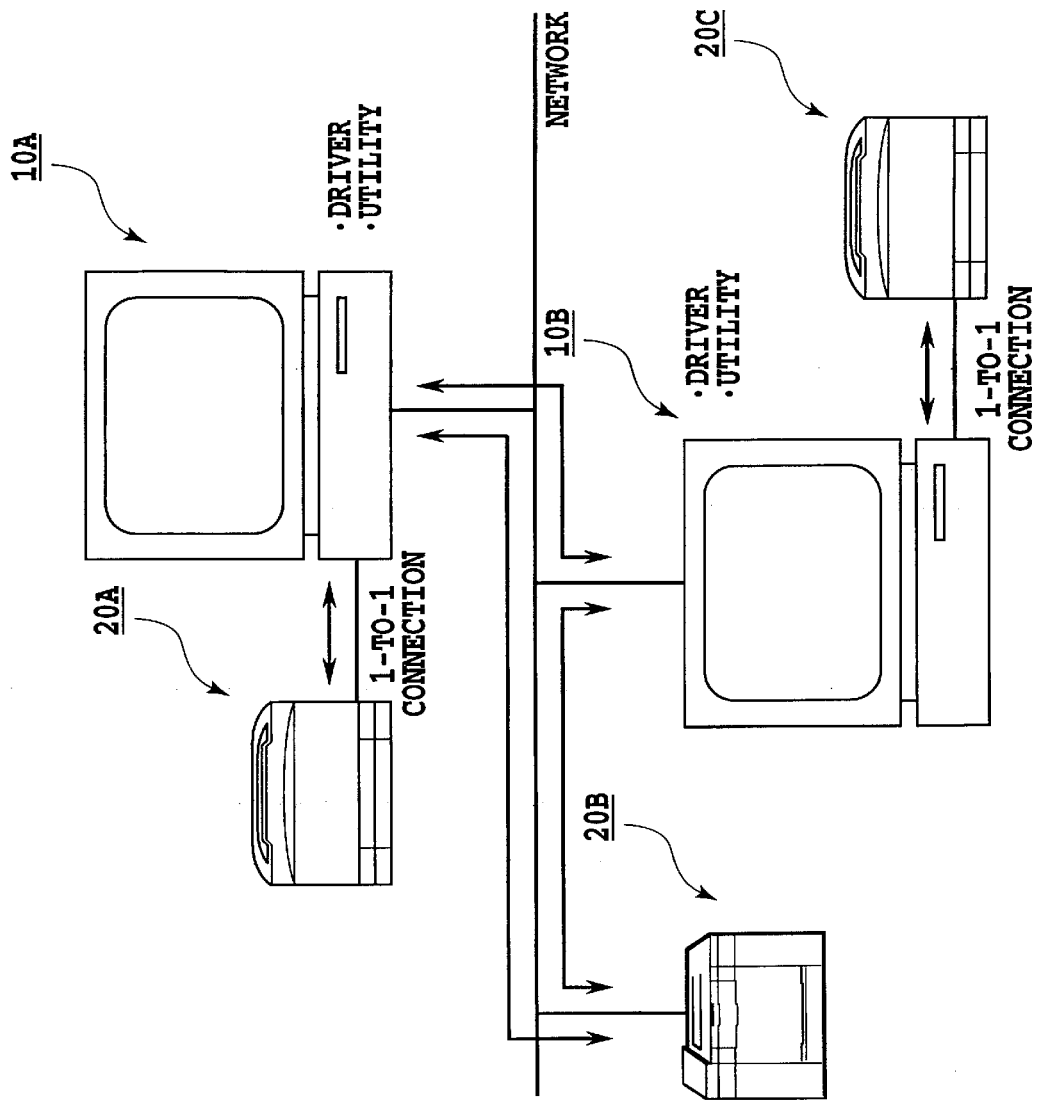
FIG. 3 is a diagram showing another configuration of the information processing system.

A first embodiment of the invention is basically based on a configuration that allows bidirectional communication between a host 10 and a printer 20 as shown in FIG. 2. More specifically, the host 10 requests the printer 20 to send calibration information of this embodiment and, in response to this request, the printer 20 sends the calibration information to the host 10. Such a configuration is of course not limited to the system shown in FIG. 2. For example, the basic configuration of FIG. 2 can also be realized in a network environment comprising a client and a server, such as shown in FIG. 3. In FIG. 3, a personal computer 10A as the client and a printer 20A or a printer 20B commonly connected to the personal computer, constitute a relationship of this embodiment between the host and the printer. The personal computer 10A can also establish the hostprinter relationship of this embodiment between it and the printer 20C through a computer 10B as the server.

Figure 4:
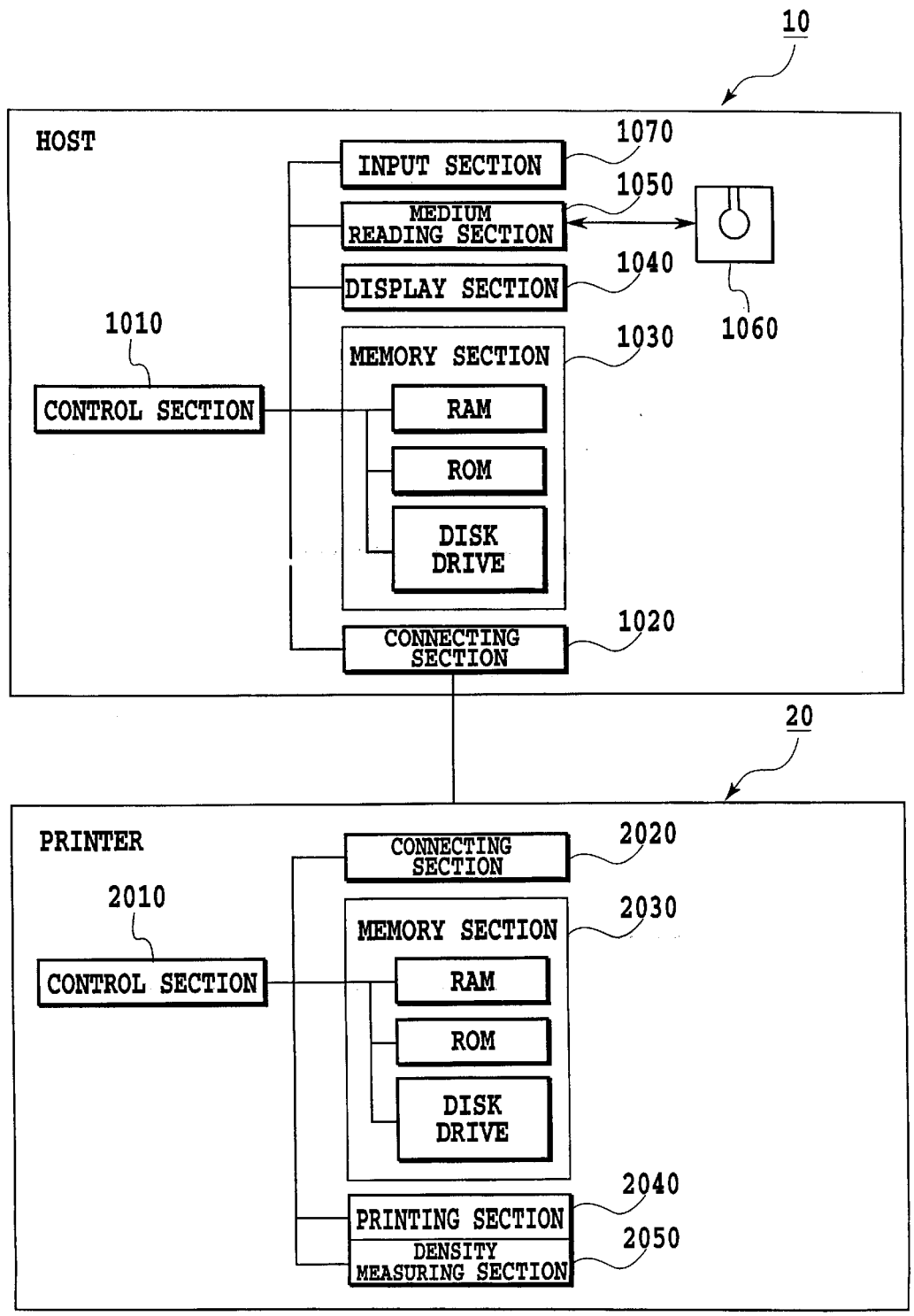
FIG. 4 is a block diagram showing structure of a host and a printer making up the information processing system.

FIG. 4 is a block diagram showing a configuration of the host 10 and the printer 20 that are realized as described above.

As shown in FIGS. 2 and 3, the host 10 is embodied in a form of the personal computer, and the printer 20 in a form of a printing apparatus of electrophotographic method using a laser beam. The host 10 has a control section 1010 including a CPU for executing whole processing of the host; a memory section 1030 including a RAM, a ROM and a disk drive, which stores data used by the control section 1010 and is used as a work area; a display section 1040 including a CRT; an input section 1070 including a keyboard; and a medium reading section 1050 for reading data stored in a floppy disk 1060 as a storage medium. On the other hand, the printer 20 has a control section 2010 and a memory section 2030, both similar to those of the host. The printer 20 also has a printing section 2040. The printing section 2040 includes a photosensitive drum, a laser beam system for forming a latent image on the photosensitive drum, a developing unit for applying toners of various colors to the latent image formed on the photosensitive drum, and a transfer unit for transferring the toner image on the photosensitive drum onto print paper.

The printing section 2040 further includes a density measuring section 2050 for measuring actual density values of the printer that are used as calibration information. More specifically, the density measuring section 2050 has a reading sensor for measuring the density of a toner image formed on the photosensitive drum. Generation of the calibration information by using the density measuring section 2050 includes: first forming a latent patch images on the photosensitive drum for each of a predetermined number of density levels in each toner color, yellow, magenta, cyan and black, by means of the laser beam system; applying toners to these latent images to form toner images; and then reading the toner images by means of the reading sensor to obtain actual density values for individual toner colors, i.e., the calibration information, described later by referring to FIG. 5.

Transfer of information or data between the host 10 and the printer 20 is carried out through their respective connecting sections 1020, 2020 having interfaces.

The printer 20 generates the calibration information at timing, described later, when there is a possibility that a significant status change of the printer may occur in the printer. Then, the printer stores this information in the RAM of the memory section 2030, so that the calibration information can be supplied in response to the request from the host 10. The printer 20 determines the timing at which the calibration information is generated, individually. The timing includes timing when power for the printer is turned on, timing when a predetermined number of sheets, e.g., 50 or 100 sheets, have been printed, and timing when a toner cartridge is exchanged with new one. The latest calibration information generated at these timings, or the latest calibration information and a few items of preceding calibration information, are stored in the RAM of the memory section 2030.

Figure 5:
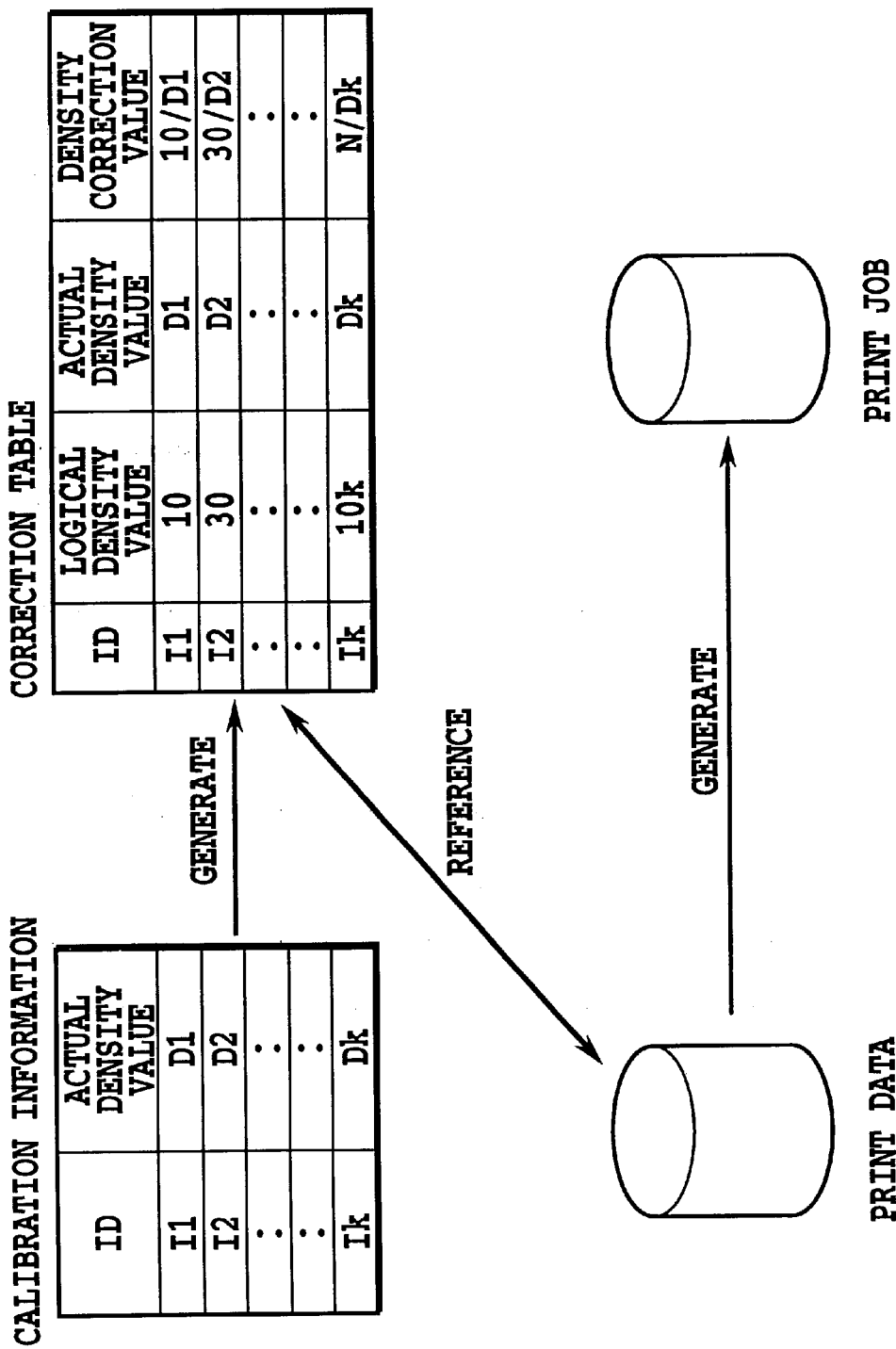
FIG. 5 is a diagram showing a process in which the host of the information processing system obtains a calibration information from the printer and generates a print job corrected according to the calibration information.

FIG. 5 is a diagram conceptually showing a process in which the host 10 generates a print job according to one embodiment of the present invention.

The host 10 obtains the calibration information retained by the printer 20 each time the host generates a print job. The calibration information includes actual density values D1–Dk for k levels of logical density values I1–Ik (10–10 k(N)) (in this embodiment, five levels). Based on this information, the host 10 generates a correction table for γ correction which table contains density correction values N/Dk correspondingly to respective the logical density values, the density correction value N/Dk representing ratio of the logical density value to the actual density value. Then the host 10 corrects a predetermined amount of print data in the print job by referring to the correction table and make the corrected print data be binary data that can be used as is by the printer 20. In this way the print job is generated.

The generation of the calibration information by the printer 20 is, as described above, achieved by first forming predetermined patch toner images on the photosensitive drum by operating the printing section 2040 (see FIG. 4) and then reading these patch toner images by the density measuring section 2050 to obtain actual density values at k levels in each output color.

It should be noted that the printing method of the printer 20 is of course not limited to the electrophotographic method using the laser beam described above. For example, an ink jet method may be used ass printing method where thermal energy is used to generate a bubble in ink and eject an ink droplet by the pressure of this bubble. In this case, predetermined patches are printed by ejecting the ink from a print head onto a sheet, and then the actual density values of the patches are measured by an optical sensor provided in a part of a carriage that mounts the print head.

Referring again to FIG. 4, the hard disk drive in the memory section 1030 of the host 10 stores modules that relate to processing to be performed in each of the embodiments of the present invention which will be described later with reference to FIGS. 10, 11 and 16 to 21. These modules are read out and putted into the RAM in the memory section 1030 of the host 10 and executed, when the host 10 is activated.

Figure 7:
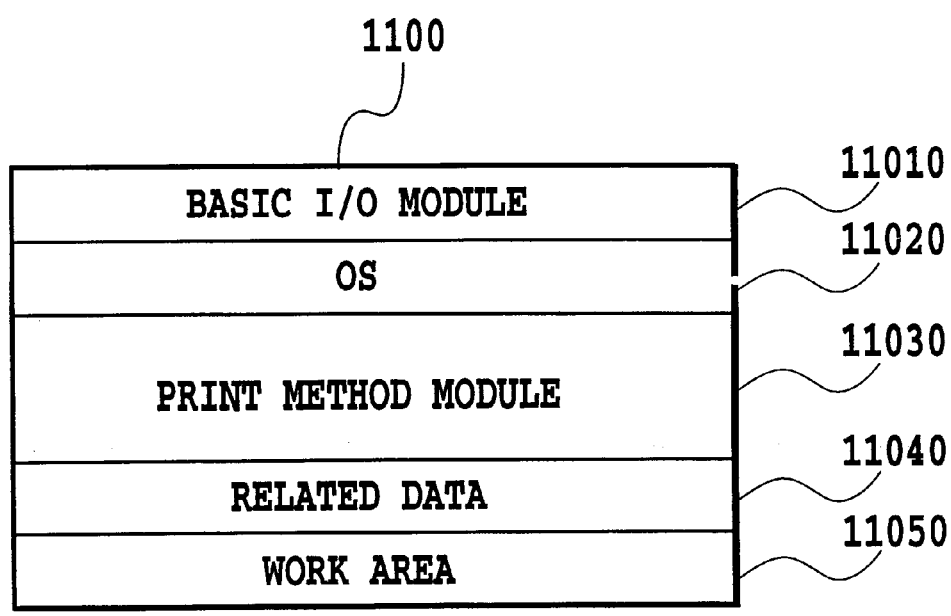
FIG. 7 is a diagram showing a memory map when the module is operating.
Figure 8:
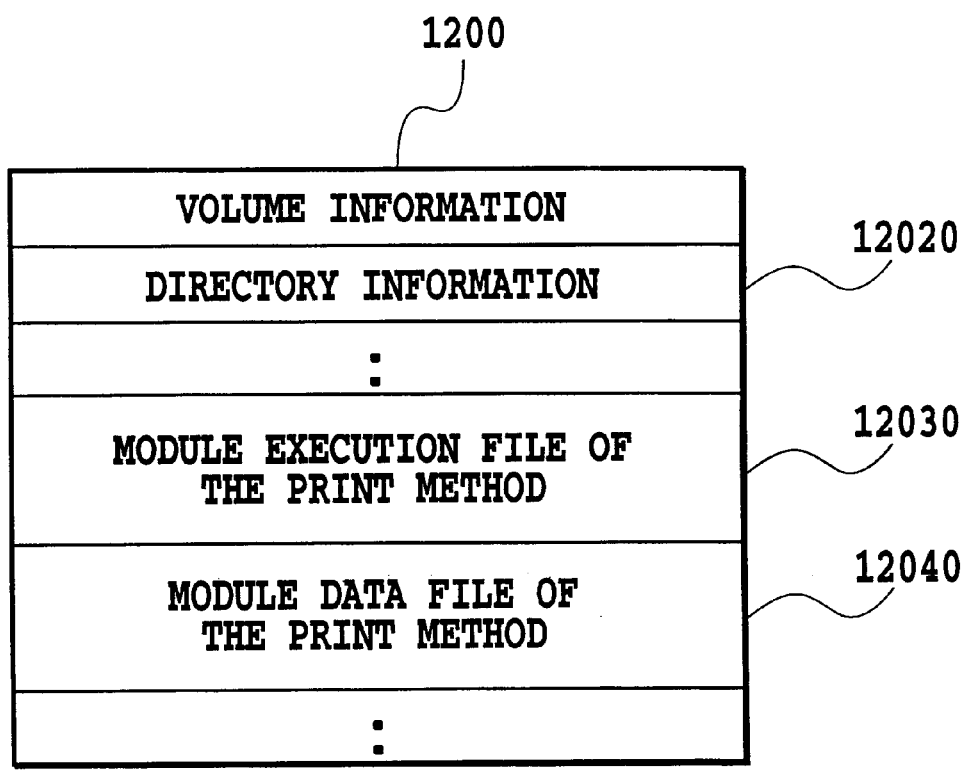
FIG. 8 is a diagram showing a structure of a storage medium in which the module is stored.

It is also possible to load the modules and associated data into the host 10 through the medium reading section 1050 and to execute the modules. Suppose, for example, the modules and associated data are stored in the storage medium 1060 shown in FIG. 6 and the content of the medium is structured as shown in FIG. 8. In this case, the module representing the sequence of processing for this embodiment as well as the associated data stored in the storage medium 1060 can be loaded into the host 10 through the medium reading section 1050 of FIG. 6. More specifically, when the storage medium 1060 is set in the medium reading section 1050 of the host 10, the modules and the associated data are read out from the storage medium 1060 under the control of the operating system (OS) and the basic I/O program. Then the read modules and data are loaded into the RAM in the memory section 1030 of the host 10 so that operations according to the modules are ready for execution. FIG. 7 shows a memory map of a state that the modules loaded into the RAM in the memory section 1030 of the host are ready for execution.

Figure 6:
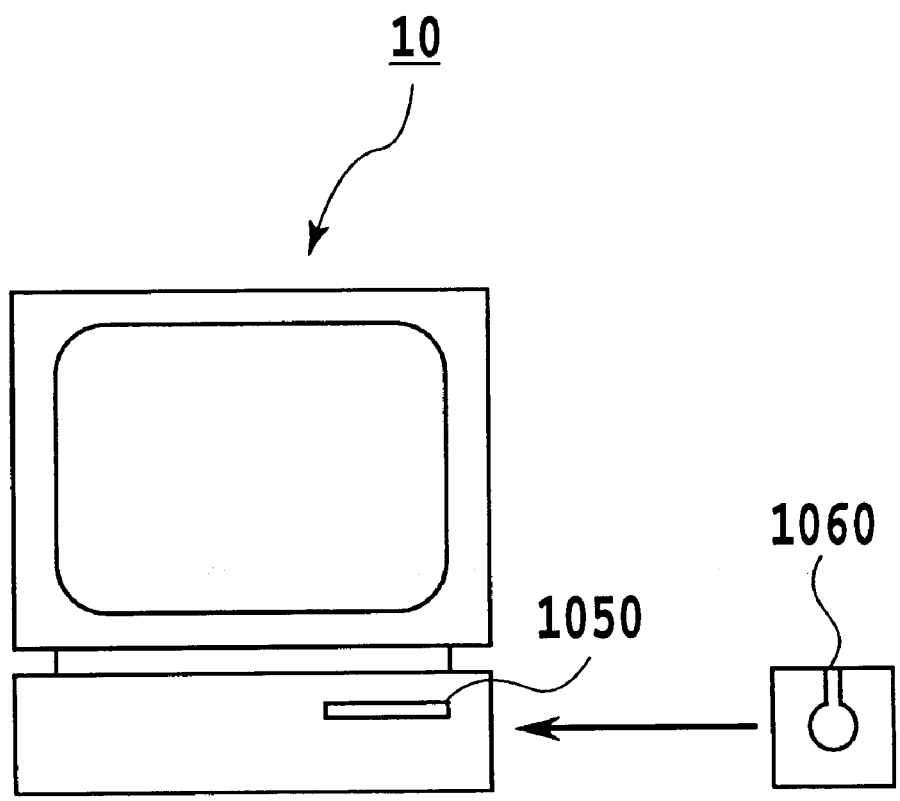
FIG. 6 is a diagram showing that a module is supplied from a storage medium in which the module is stored into the host in the information processing system.

Alternatively, the modules representing the sequence of processing for this embodiment as well as the associated data, both stored in the storage medium 1060 of FIG. 6, may be installed temporarily in the disk drive of the memory section 1030 of the host 10. When the module and associated data are used, they may be loaded into the RAM of the memory section 1030 from the disk drive of the memory section 1030.

The modules for each of the embodiments of the invention are coded programs according to the flowcharts shown in FIGS. 10, 11, 16, 17 and 21.

Now, several examples of processing executed by one system configuration according to the present invention will be explained in the following.

First Embodiment

Figure 9:
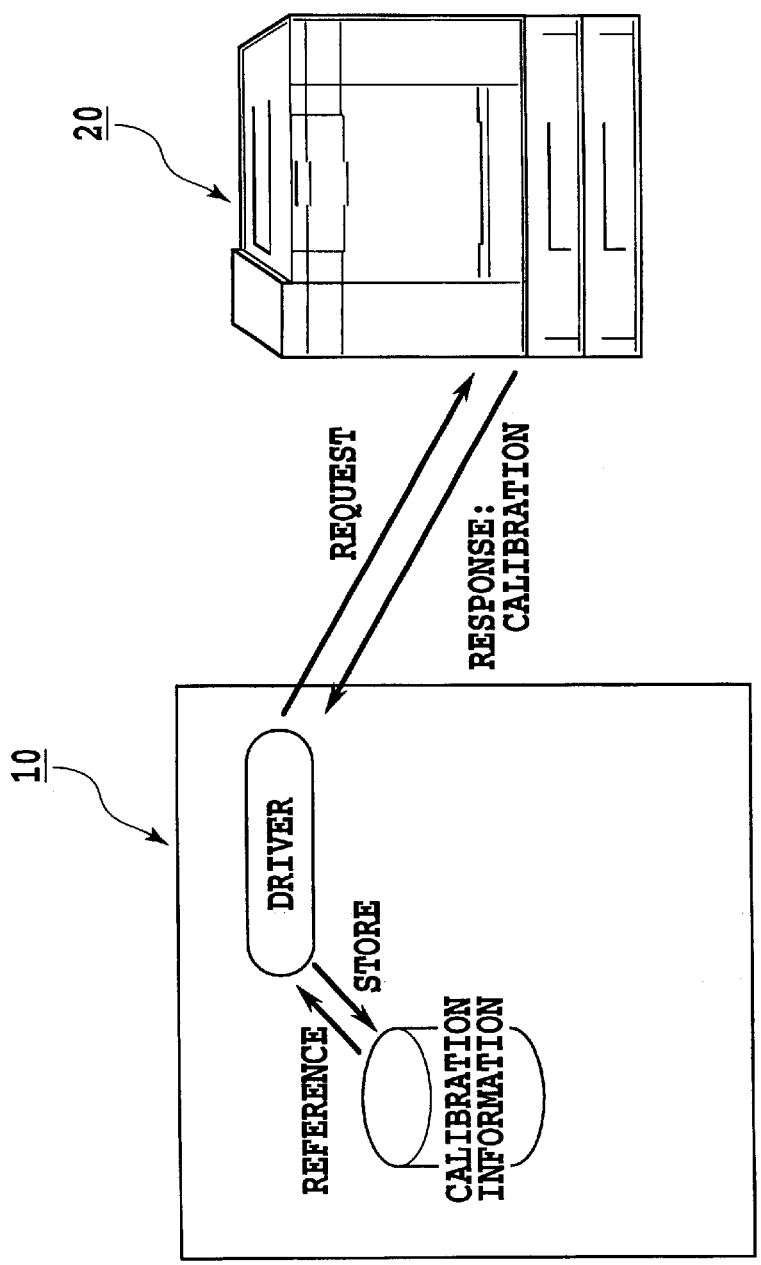
FIG. 9 is a diagram showing a configuration of a first embodiment of the present invention by which the host obtains the calibration information from the printer.

FIG. 9 shows a software configuration as the first embodiment of the present invention in which the host 10 obtains the calibration information from the printer 20 to generate a print job. As shown in the figure, a printer driver of the host performs all processing for the print job. More specifically, the printer driver obtains the calibration information from the printer 20 and stores it into the memory, generates the correction table by referencing the calibration information and, based on the correction table, generates the print job for transfer to the printer 20.

Figure 10:
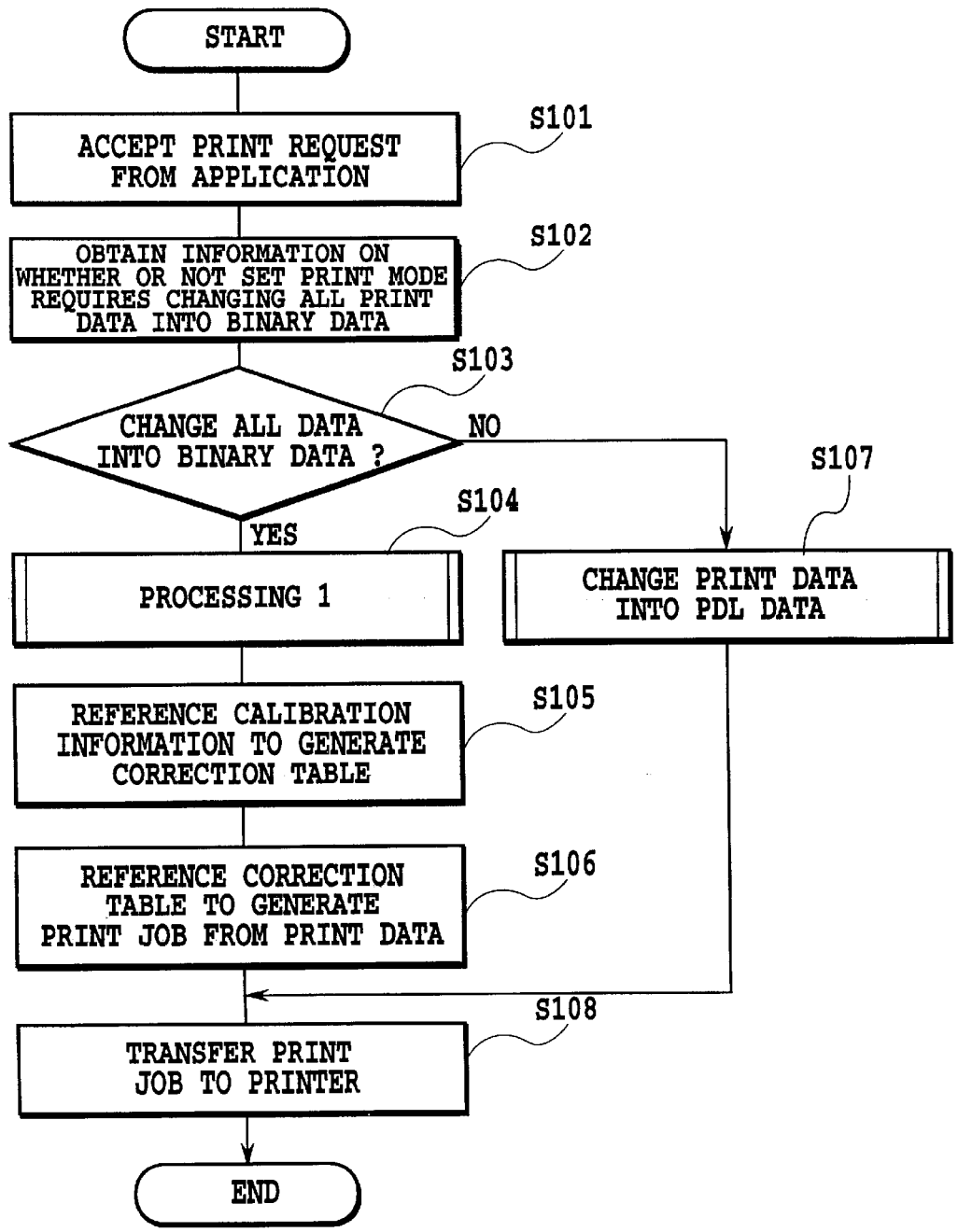
FIG. 10 is a flowchart showing a procedure for generating a print job in the embodiment of the present invention.
Figure 11:
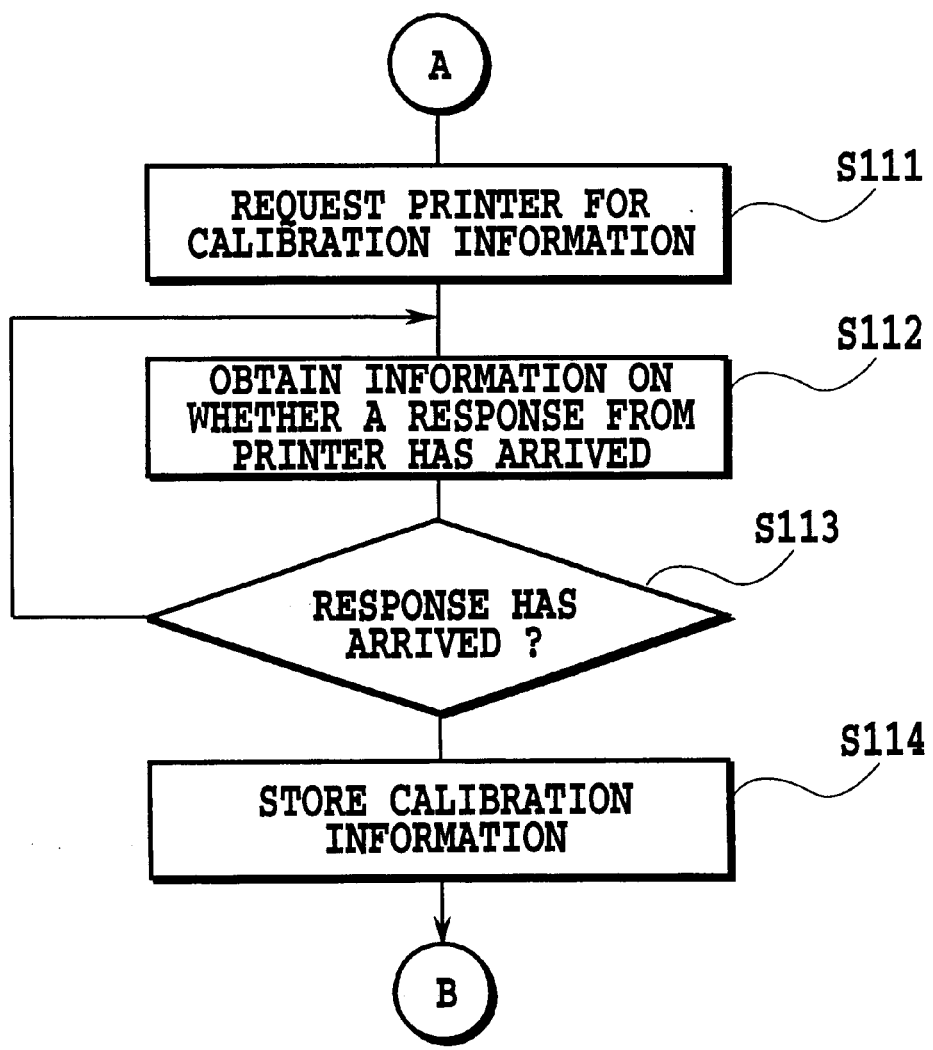
FIG. 11 is a flowchart showing a procedure for generating a print job in the embodiment of the present invention.

FIGS. 10 and 11 are flowcharts respectively representing mainly sequences of processing for generating the print job according to this embodiment. The "processing 1" in FIG. 10 is detailed by FIG. 11.

The control section 1010 of the host 10 accepts a print request from an application and starts print processing (step S101). In this embodiment, the control section 1010 obtains print data from an OS or the application and stores it in the disk drive of the memory section 1030. Is should be noted that the print data may of course be obtained from the OS or the application as required before starting this processing.

Next, the control section 1010 obtains, from the print data stored in the disk drive of the memory section 1030, print mode information which indicates whether or not a print mode requiring for changing all the print data into binary data is set, and stores the print mode information in the RAM of the memory section 1030 (step S102). Then the control section 1010 checks the stored print mode information to determine whether the set print mode requires for changing all the print data into binary data (step S103). When the check result shows that the print mode is not the one that requires for changing all the print data into binary data, the control section generates a print job by transforming the print data into PDL data (step S107). Then the control section transfers this print job to the printer (step S108).

The print mode can be set, for example, by that a user sets the print mode on a user interface controlled by the print driver.

At step S103, when it is determined that a print mode requiring for digitizing all the print data is set, at step S104, the "processing 1" which is detailed in FIG. 11 is executed.

More specifically, as shown in FIG. 11, the control section 1010 requests the printer control section 2010 for the calibration information through the connecting section 1020 of the host 10 and the connecting section 2020 of the printer 20 (step S111). Then, the control section 1010 obtains information on whether a response has arrived from the printer control section 2010 (step S112) and, based on this information, determines whether the response is returned from the printer control section 2010 (step S113). While there is no response from the printer control section 2010, the control section 1010 repeats the steps S112 and S113 until it receives the response.

On the other hand, in response to the request from the control section 1010 of the host 10, the control section 2010 of the printer 20 obtains the latest calibration information stored in the RAM of the memory section 2030 and sends it to the control section 1010 through the printer connecting section 2020 and the host connecting section 1020. The control section 1010 then decides at step S113 that the response has sent from the printer control section 2010, and stores the calibration information sent from the printer 20 in the RAM of the memory section 1030 in a data format shown in FIG. 12 (step S114).

Figure 13:
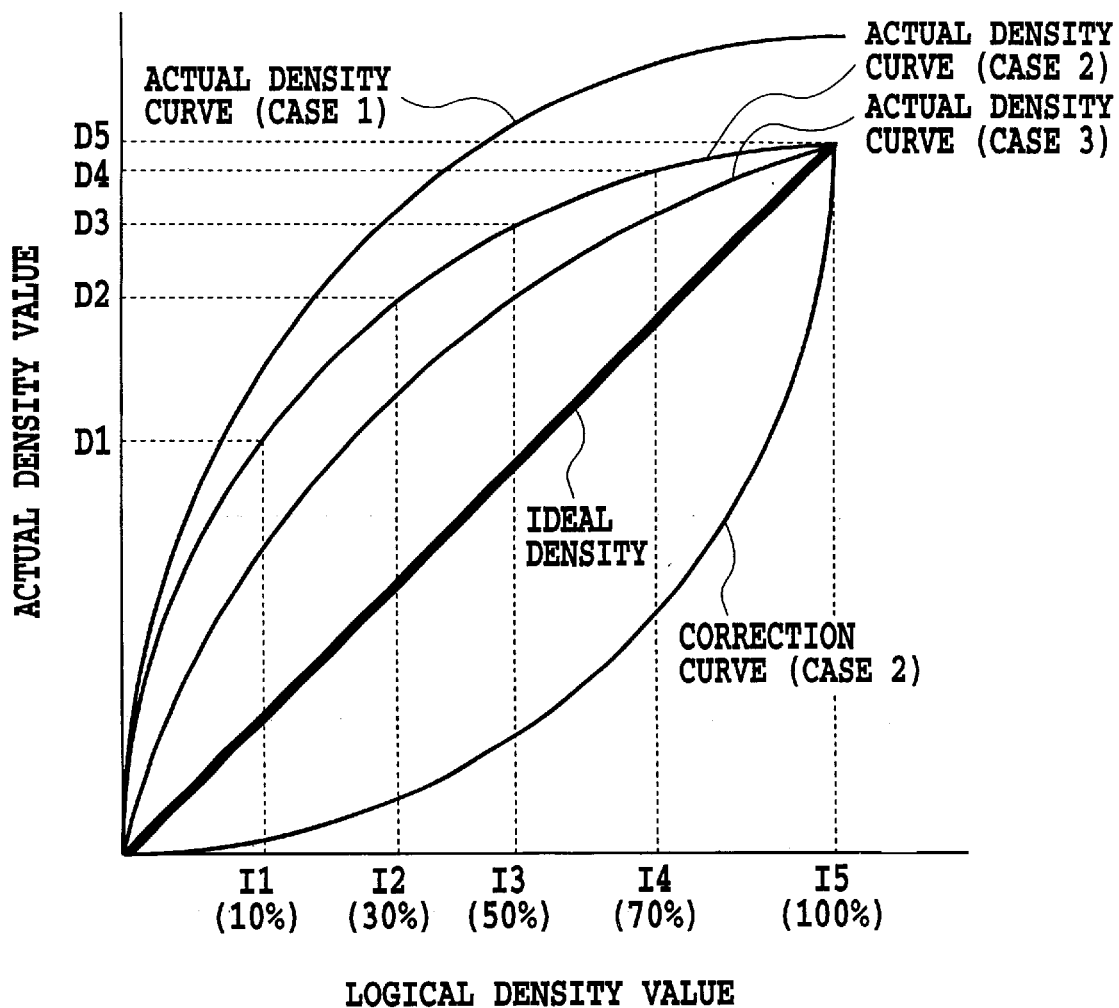
FIG. 13 is a graph showing a relation between a logical density and an actual density obtained by measuring an actual printed result produced by the printer, i.e., a printing characteristic of the printer.

The calibration information shown in FIG. 12 represents the latest state of the printer and shows the relation between the logical density value and the actual density value at five measuring points shown in FIG. 13. More specifically, in this embodiment, the measuring points are where the logical density values are 10% (I1), 30% (I2), 50% (I3), 70% (I4) and 100% (I5) of the maximum density. It is of course possible to use the calibration information with the locations of measuring points changed or with an increased or decreased number of measuring points.

FIG. 13 is a graph showing the relation between the logical density value and the actual density value realized in the printer. Usually, a density value sent from the host to the printer, i.e., the logical density value, does not exactly agree with the actual density value of a visible image formed by the printer. This difference may be increased depending on environmental variations of the printer and electric and mechanical factors of the printer. Further, the actual density curve differs from one printer to another and, even in the same printer, may change according to the environment and condition of using the printer. FIG. 13 shows three kinds of the actual density curves (case 1 to case 3). The calibration information shown in FIG. 12 represents the case 2. A horizontal axis of the graph represents the logical density value, i.e., the density value represented by the print data received by the printer. The vertical axis of the graph represents the actual density value realized by the printer based on the logical density value. In the example shown in FIG. 13, the actual density values plotted corresponding to the logical density values form convex curves, indicating that an intermediate density portion of the visible image tends to be printed darker than the logical density values. In order to approximate the actual density to an ideal density, which is represented by a straight line inclined at an angle of 45 degrees upward toward the right, the logical density needs to be corrected by the values represented by a concave curve. The concave curve shown in the figure is a correction curve for the actual density curve of the case 2, and the points on this curve represent density correction values.

When the "processing 1" (step S104) is completed, the control section 1010 refers to the calibration information (FIG. 12) stored in the memory section 1030, generates the correction table as shown in FIG. 14, i.e., a table satisfying the relation of the correction curve shown-in FIG. 13, and stores the correction table in the RAM of the memory section 1030 (step S105). Then, the control section 1010 generates the print job (binary data) by using the correction table and the print data stored in the RAM of the memory section 1030 and stores the generated print job in the RAM of the memory section 1030 (step S106). In this way, the print job that is corrected according to the latest state of the printer 20 can be generated. Then, the control section 1010 transfers the print job stored in the RAM of the memory section 1030 to the printer (step S108).

As described above, this embodiment realizes a print processing configuration as shown in FIG. 9 in which the calibration information can be obtained in real time to generate a print job that is efficiently and precisely corrected.

Second Embodiment

A second embodiment of the present invention provides another configuration for obtaining the calibration information ("processing 1" of FIGS. 10 and 11).

Figure 15:
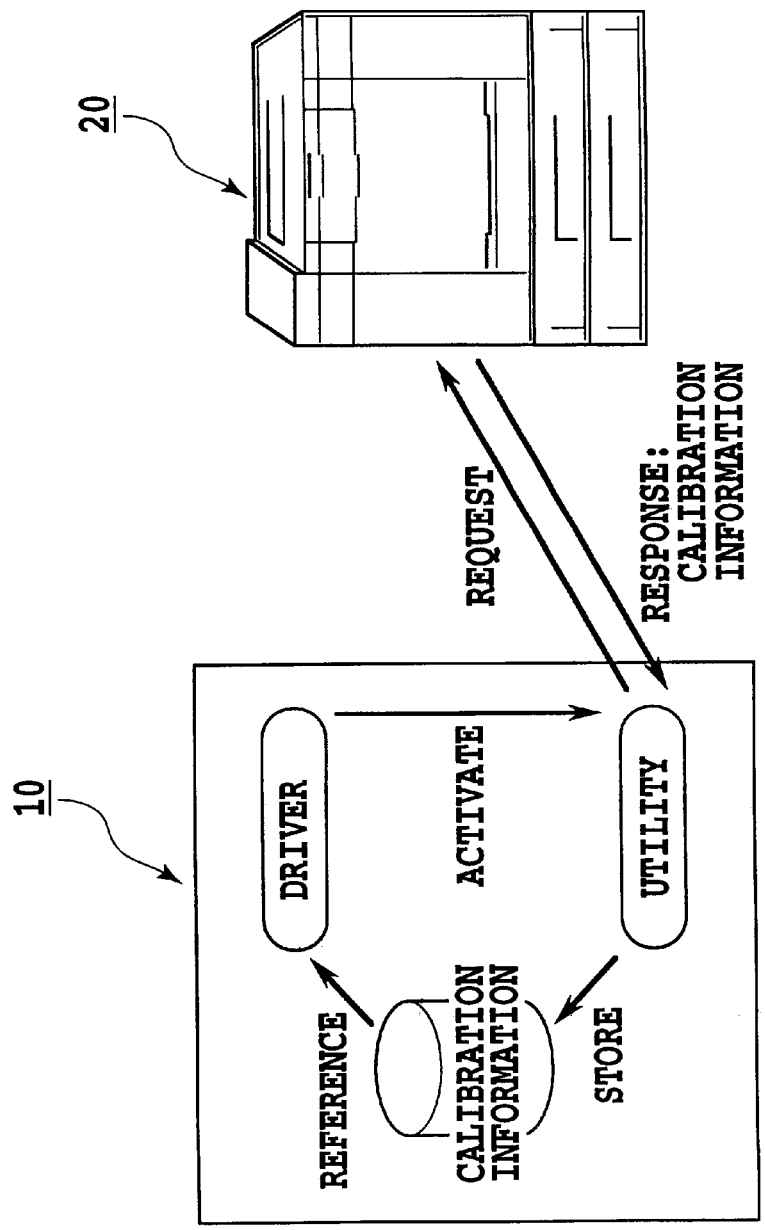
FIG. 15 is a diagram showing a configuration of a second embodiment of the present invention by which the host obtains the calibration information from the printer.

In the above first embodiment, the processing for obtaining calibration information and the processing for generating the correction table and the print job are realized in a single program (the printer driver). In some information processing systems these processing may not be able to be realized in one program owing to a configuration of a system (OS). In such systems when the print data are sent to the printer in the form of a binary print job, the efficient and precise correction processing may be difficult to be realized. In this embodiment therefore, as shown in FIG. 15, a program for obtaining the calibration information (hereinafter referred to as "utility") and a program for generating the correction table and the print job (hereinafter referred to as a "printer driver") are given separate roles in the correction process. More specifically, the printer driver only activates the utility, and the utility, when driven by the printer driver, obtains the calibration information from the printer 20 and stores it.

Figure 16:
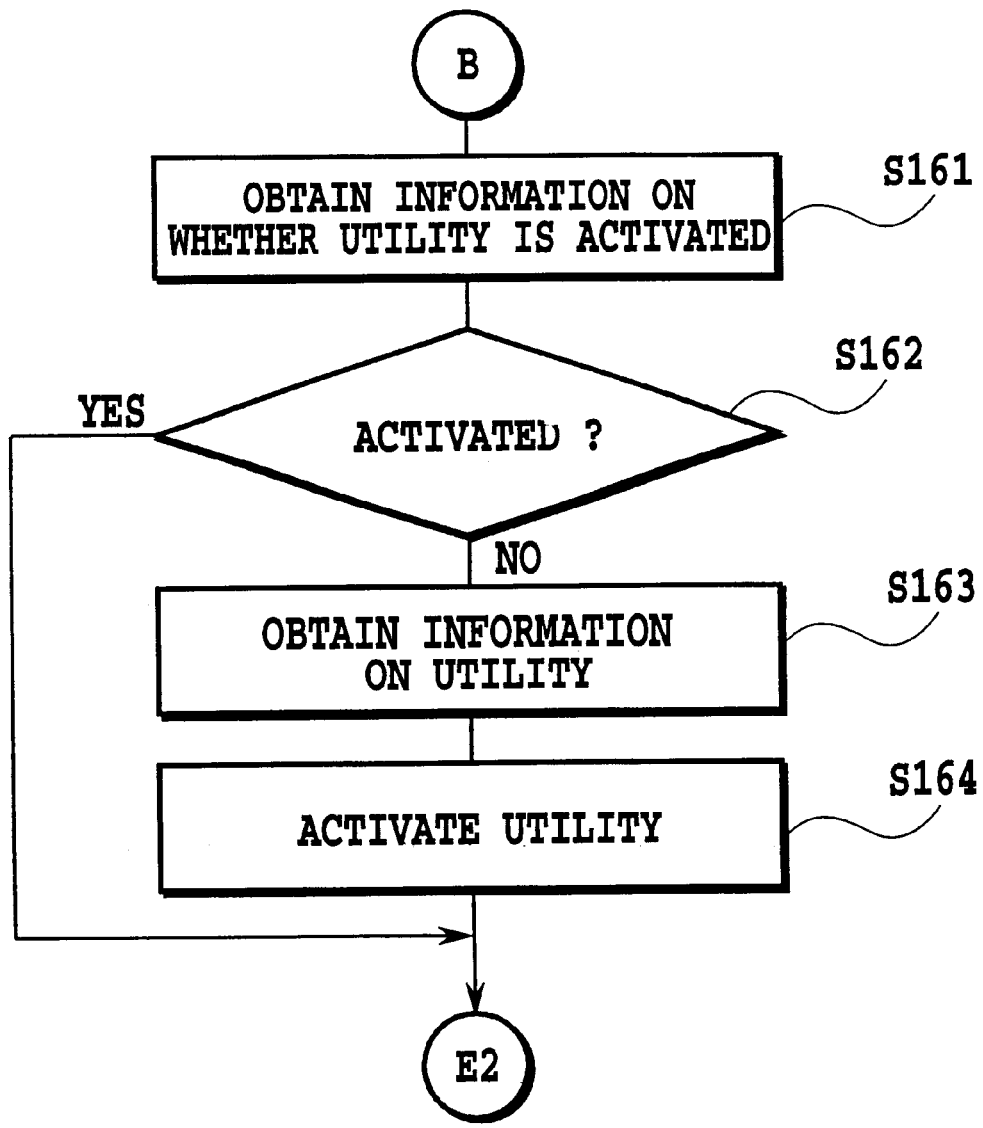
FIG. 16 is a flowchart showing a procedure for generating a print job in the embodiment of the present invention.
Figure 17:
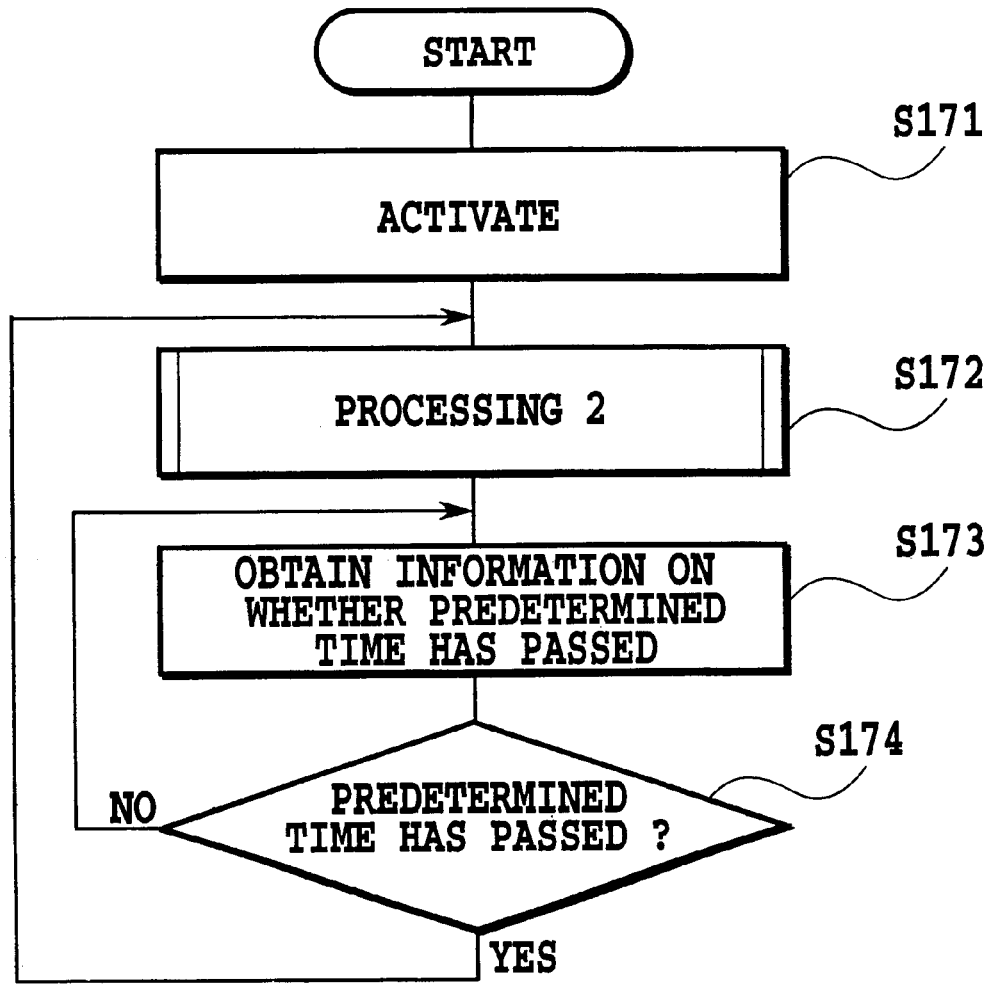
FIG. 17 is a flowchart showing a procedure for generating a print job in the embodiment of the present invention.

This embodiment includes processing shown in FIGS. 10, 11, 16 and 17. The "processing 1" in FIG. 10 is different from that used in the first embodiment and is detailed in FIG. 16, which represents a sequence of steps executed by the printer driver. The "processing 2" in FIG. 17 is detailed in FIG. 11 explained in the first embodiment and represents a sequence of steps performed by the utility. Information on the utility (the name of the utility, the location where the utility is stored, the activating method, the location where the calibration information retained by means of the utility is stored, etc.) is stored in the disk drive of the memory section 1030.

First, the sequence of processing executed by the printer driver will be explained.

The control section 1010 performs the processing of steps S101–S103 as described earlier. Then, when the check of the print mode information has found that the print mode requiring for changing all the print data into binary data is set, the control section performs the "processing 1" of step S104.

More specifically, as shown in FIG. 16, the control section 1010 obtains information on the program currently activated in the system and stores it in the RAM of the memory section 1030. Then, from the name of the utility stored in the disk drive of the memory section 1030 and the information on the currently activated program stored in the RAM of the memory section 1030, the control section obtains information for determining whether the utility is activated and stores the information in the RAM of the memory section 1030 (step S161). The control section 1010 checks the information stored in the RAM of the memory section 1030 to determine if the utility is activated (step S162). If it is decided that the utility has been activated, the control section 1010 exits the processing of FIG. 16 and proceeds to the step S105 shown in FIG. 10.

When, on the other hand, it is decided that the utility is not activated, the control section 1010 obtains information on the location where the utility is stored and the method of activating the utility from the utility information stored in the disk of the memory section 1030 (step S163), and activates the utility by using the information on the utility (step S164).

When the utility program is activated by the printer driver as described above, the processing in the utility shown in FIG. 17 starts to be executed.

More specifically, by executing the step S164 by the printer driver, the control section 1010 activates the utility (step S171). Thus, the control section 1010 executes the "processing 2" at step S172, i.e., obtains the calibration information from the printer 20 in steps S111–S114 of FIG. 11. When the host 10 does not have any calibration information generated by the printer 20 connected to it, this processing causes the calibration information reflecting the latest printer status to be newly obtained and stored. When the host 10 does have the calibration information previously generated by the printer 20, the calibration information is updated by the one reflecting the latest printer status.

After obtaining the calibration information, the control section 1010 obtains, from a timer function of the system, information on whether a predetermined period of time has passed and stores the information in the RAM of the memory section 1030 (step S173). By referencing the stored information, the control section determines if the predetermined period has passed (step S174). When it is decided that the predetermined period has not passed, the control section 1010 returns to the step S173. When it is decided that the predetermined period has passed, the control section 1010 returns to the "processing 2" (step S172). As a result, each time the predetermined period has passed, the processing of steps S111-S114 is executed to obtain the calibration information from the printer 20 periodically and thereby perform updating based on the obtained calibration information.

Referring again to FIG. 10, the sequence of processing by the printer driver will be explained.

After executing the processing for activating the utility in step S104 (steps S161–S164 in FIG. 16), the control section 1010 obtains, from the utility information stored in the disk drive of the memory section 1030, the information representing the location where the utility has stored the calibration information. Then, by referring the calibration information stored by the utility, the control section 1010 generates the correction table as shown in FIG. 14 and stores it in the RAM of the memory section 1030 (step S105). After this, the control section 1010 executes the processing of steps S106 and S108 as described earlier.

In this way, even in the information processing system with limitations in the system (OS), this embodiment can realize a processing configuration like the one shown in FIG. 15 to obtain the calibration information periodically to generate a print job that has undergone efficient and precise correction.

Third Embodiment

Figure 18:
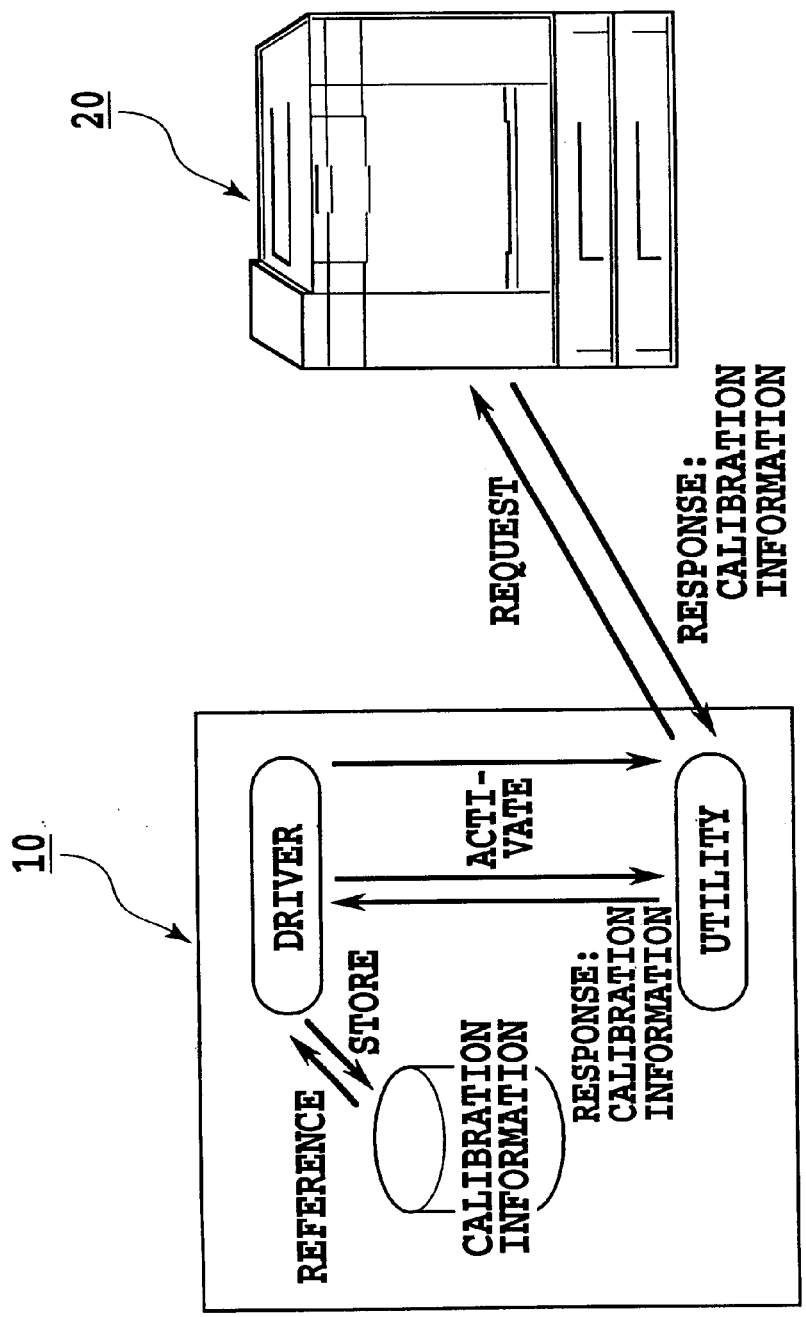
FIG. 18 is a diagram showing a configuration of a third embodiment of the present invention by which the host obtains the calibration information from the printer.

A third embodiment of the present invention concerns another configuration for obtaining the calibration information ("processing 1" or "processing 2"). In the second embodiment described above, the utility obtains the calibration information at predetermined intervals. Since the processing for generating the print job by the printer driver and the processing for obtaining the calibration information by the utility are executed asynchronously, the precision of correction may degrade. For this reason, this embodiment synchronizes the printer driver processing and the utility processing in performing the correction, as shown in FIG. 18. More specifically, this embodiment employs a configuration in which when the printer driver requests the utility to send the calibration information, the utility returns the calibration information in response to the request.

Figure 19:
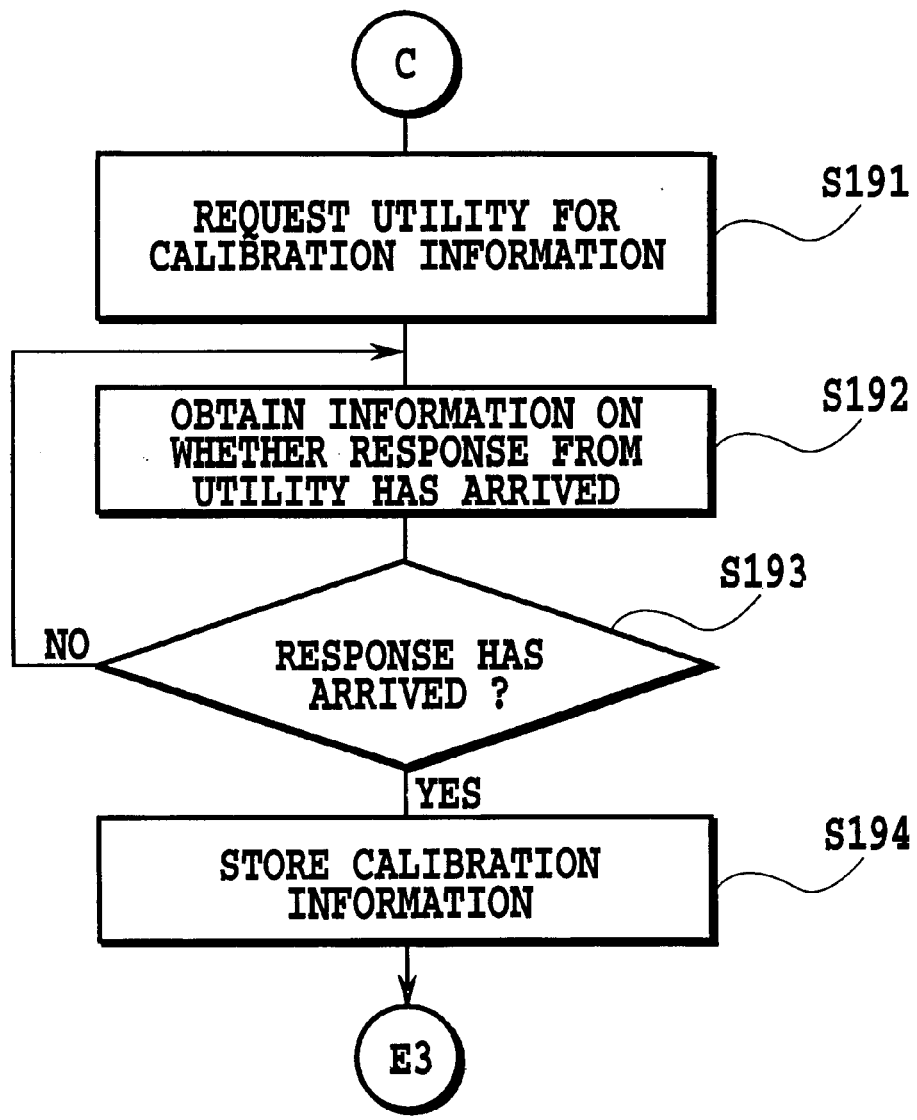
FIG. 19 is a flowchart showing a procedure for generating a print job in the embodiment of the present invention.
Figure 20:
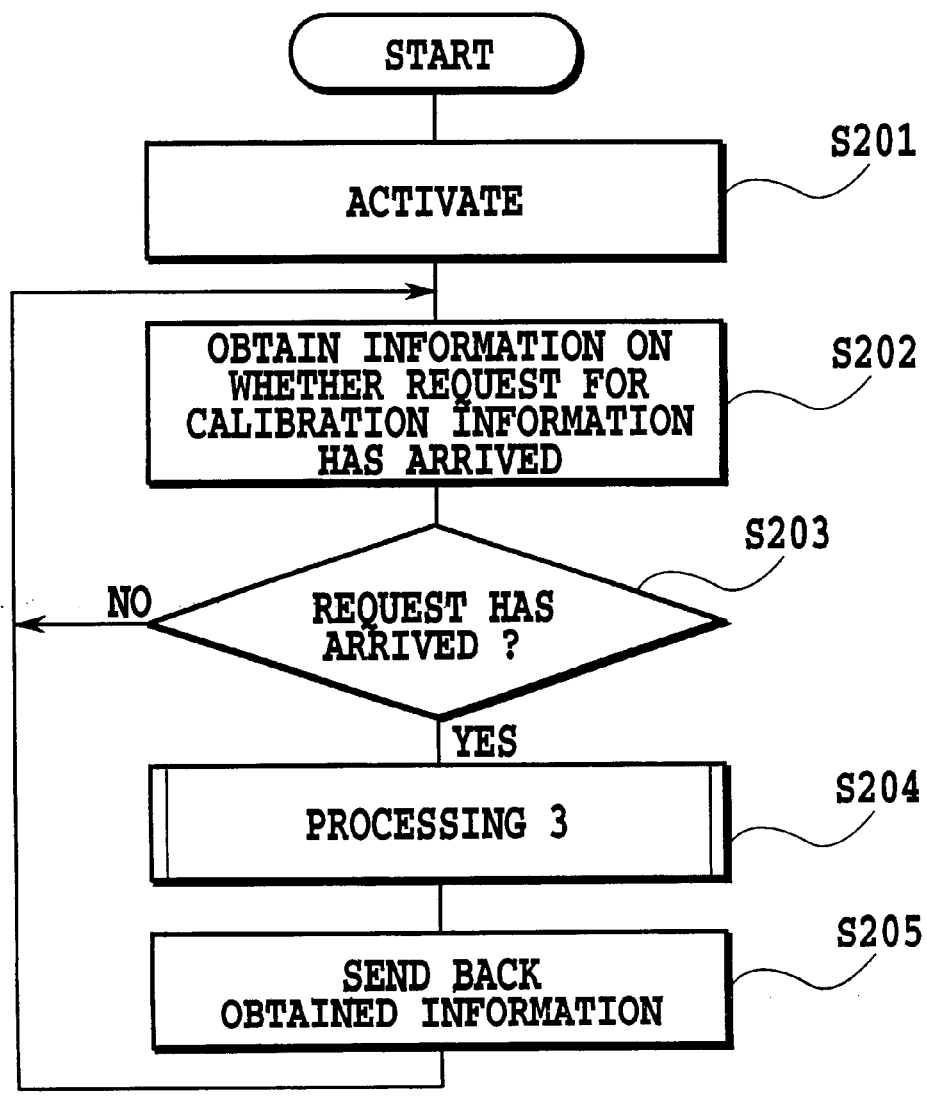
FIG. 20 is a flowchart showing a procedure for generating a print job in the embodiment of the present invention.

This embodiment generates the print job by executing the processing shown in FIGS. 10, 11, 16, 19 and 20. The "processing 1" in FIG. 10 is detailed in FIGS. 16 and 19 and executed in the order of steps in FIGS. 16 and FIG. 19. They represent a sequence of steps in the printer driver processing. The "processing 3" in FIG. 20 is detailed in FIG. 11 and represents a sequence of steps in the utility processing. The information on the utility (the name of the utility, the location where the utility is stored, the activating method, the location where the utility stores the calibration information, the method of process communication, etc.) is stored in the disk drive of the memory section 1030.

First, the sequence of steps executed by the printer driver in the host 10 will be described as follows.

The control section 1010 performs the steps S101–S103 shown in FIG. 10 and, when it is decided that the result of check on the print mode information indicates a print mode requiring for changing all the print data into binary data, performs the "processing 1" at step S104, i.e., steps S161–S164 of FIG. 16 and steps S191–S194 of FIG. 19.

More specifically, after performing the processing for activating the utility as shown in FIG. 16, the control section 1010 obtains the method of process communication with the utility from the utility information stored in the disk drive of the memory section 1030 and requests the utility for the calibration information, as shown in FIG. 19, (step S191). Next, the control section 1010 obtains the information on whether a response is returned from the utility by the process communication, and stores the information in the RAM of the memory section 1030 (step S192). Then the control section checks the content of the stored information to determine whether the response has arrived (step S193). When it is decided that the response has not yet arrived, the control section returns the processing to the step S192 and repeats the subsequent steps until the calibration information is received from the utility. When it receives the calibration information, as described later, the control section stores it in the memory section 1030 (step S194).

On the other hand, when activated by the printer driver (step S164), the utility in the host 10 executes the next processing.

In response to the utility activating step S164 in the printer driver processing, the control section 1010 activates the utility (step S201). Next, the control section 1010 obtains the information on whether the request for the calibration information has arrived from the driver using the process communication and stores that information in the RAM of the memory section 1030 (step S202). The control section 1010 checks this information to determine whether the request has arrived (step S203). When it is decided that the inquiry has not yet arrived, the control section returns the processing to step S202. When it is decided that the request has arrived, the control section 1010 executes the "processing 3" at step S204, i.e., steps S111 to S114 of FIG. 11 to obtain the calibration information from the printer 20 as described earlier.

The control section 1010 uses the process communication to send back to the driver the calibration information which was obtained from the printer (step S205). Now, the calibration information reflecting the latest printer status is returned to the driver.

Referring again to FIG. 19 representing the processing executed by the printer driver of the host 10, the control section 1010, when it decides at step S193 that the response has arrived from the utility, stores in the RAM of the memory section 1030 the calibration information obtained from the utility (step S194) and exits the processing shown in FIG. 19.

After this, the control section 1010, as shown in FIG. 10, refers to the calibration information, which was obtained from the utility and stored in the RAM of the memory section 1030, generates the correction table shown in FIG. 14, and stores it in the RAM of the memory section 1030. Then it performs steps S106 to S108 as described earlier.

In this way, even in an information processing system with limitations in the system (OS), this embodiment can realize the processing configuration like the one shown in FIG. 18 to obtain the calibration information in real time to generate a print job that has undergone efficient and precise correction.

Fourth Embodiment

A fourth embodiment of the present invention concerns still another configuration for obtaining the calibration information.

The third embodiment described above allows the printer driver to obtain the calibration information from the utility through the process communication while the driver executes the printing processing. In some information processing systems, however, the process communication with other software cannot be established during execution of the printing processing because of the configuration of the system (OS). In such systems, in the case that the print data is sent to the printer in the form of a binary print job, it may be difficult to realize an efficient and precise correction. Hence, this embodiment adopts a configuration in which, prior to executing the print processing, the printer driver process-communicates with the utility to obtain the calibration information and perform correction.

This embodiment includes processing shown in FIGS. 10, 11, 16, 19, 20 and 21.

Figure 21:
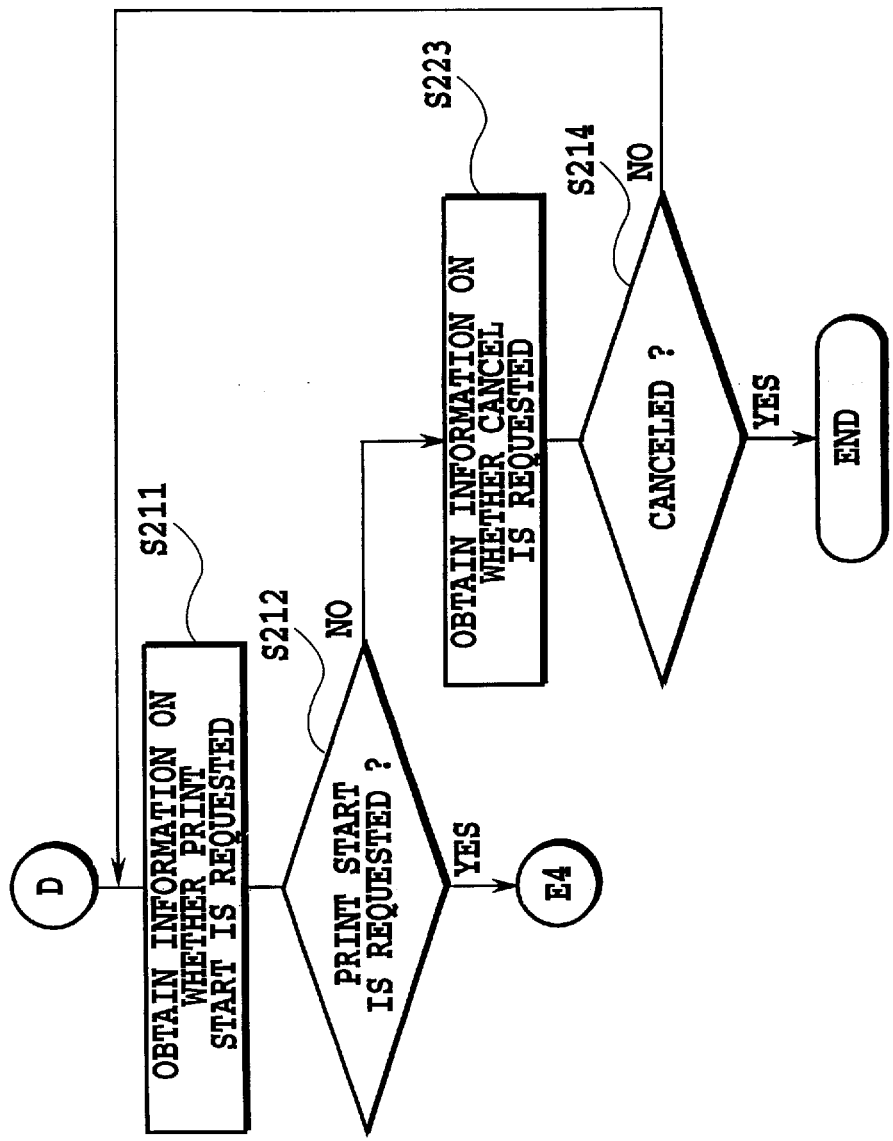
FIG. 21 is a flowchart showing a procedure for generating a print job in the embodiment of the present invention.

In the processing shown in FIG. 10, the steps of processing shown FIGS. 16,19 and 21 are executed in that order before performing the step S101 of FIG. 10, and the "processing 1" portion in FIG. 10 does not perform any special processing. The steps shown in these figures represent the processing performed by the printer driver. On the other hand, the "processing 3" in FIG. 20 is detailed in FIG. 11, and the steps shown in FIGS. 20 and 11 represent the processing performed by the utility. The information on the utility (the name of the utility, the location where the utility is stored, the activating method, the location where the utility stores the calibration information, etc.) is stored in the disk drive of the memory section 1030. The printer driver has a user interface as shown in FIG. 22 (hereinafter referred to as a "print processing dialog") which is displayed on a display section 1040 shown in FIG. 4.

First, the sequence of steps performed by the printer driver of this embodiment will be explained.

The control section 1010 activates the processing shown in FIG. 10. Before executing the step S101, the control section 1010 checks by using the input section 1070 that an "obtain information" button on the print processing dialog as shown in FIG. 22 is depressed. At this point in time, the print processing by the driver is not yet started. Then, the steps S161–S164 of FIG. 16 and the steps S191–S194 of FIG. 19 are executed, allowing the printer driver to obtain the calibration information reflecting the latest printer state.

Figure 22:
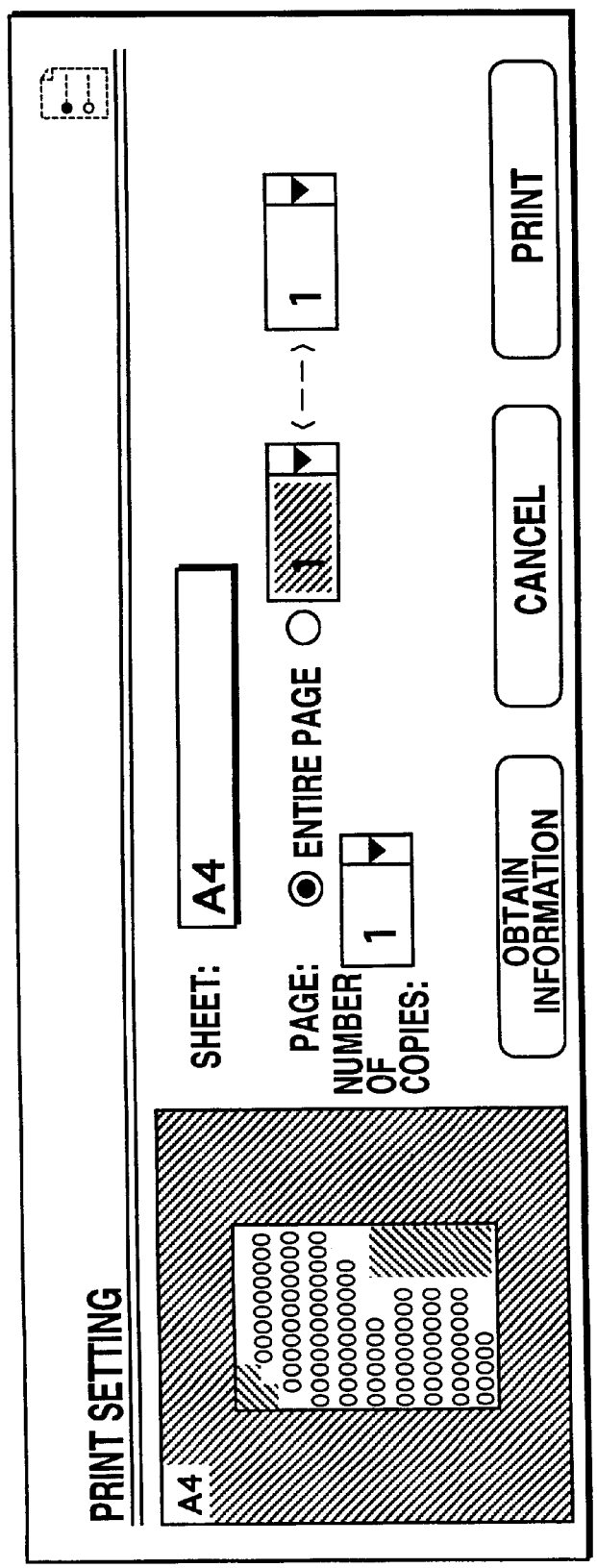
FIG. 22 is a diagram showing a display status of a print processing dialog in a fourth embodiment of the present invention.

Next, as shown in FIG. 21, the control section 1010 uses the input section 1070 shown in FIG. 4 to obtain information on whether a "print" button on the print processing dialog as shown in FIG. 22 is depressed, and stores the information in the RAM of the memory section 1030 (step S211). Then, the control section 1010 checks the information to see if the "print" button is pressed (step S212). When it is decided that the "print" button is not pressed, the control section 1010 now obtains information on whether a "cancel" button on the print processing dialog as shown in FIG. 22 is pressed, and stores the information in the RAM of the memory section 1030 (step S213). Then it checks the information to see if the "cancel" button is pressed (step S214). When it is decided that the "cancel" button is pressed, the control section 1010 terminates the processing. When the "cancel" button is found not pressed, the control section 1010 returns the processing to the step S211.

When the step S212 determines that the "print" button is pressed, the print processing is started at this point to execute the steps S101–S108 of FIG. 10. In that case, the calibration information referred at the step S105 is the one that was obtained from the utility immediately before the driver executed the print processing. The processing done by the utility is that of steps S201–S205 of FIG. 20 as in the case of the third embodiment.

In this way, even in an information processing system with limitations in the system (OS), this embodiment can realize the processing configuration like the one shown in FIG. 18 and obtain the calibration information to generate a print job that has undergone efficient and precise correction.

The constitutional elements as the example configurations described in embodiments are identical with or replaceable with the following.

The printer is identical with or replaceable with, for example, plotter, copying machine and FAX; the host is identical with or replaceable with personal computer, workstation and minicomputer; the control section with software, ROM and RAM; the connecting section with serial interface board, parallel interface board and network interface board; the memory section with memory, magnetic disk drive, magnetooptical disk drive and magnetic tape drive; printing section with laser beam printer, bubble jet printer, LED printer and thermal transfer printer; the display section with CRT and liquid display; the input section with keyboard, mouse and trackball; the medium reading section with FD drive, MO drive, CD-ROM drive and IC memory card drive; and the storage medium with FD, MO, CD-ROM and IC memory card.

Other Embodiments

The present invention may be applied to a system consisting of a plurality of devices (such as a host computer, an interface device, a reader and a printer) or to single device (such as a copying machine and a facsimile).

The present invention also includes a configuration in which a computer in an apparatus or system, which is connected with a variety of devices so as to realize functions of the foregoing examples shown in FIGS. 9 to 11 and FIGS. 15 to 21, is loaded with a program code of software and in which these devices are operated according to the program stored in the computer (CPU or MPU).

In this case, the software program code itself realizes the functions of these examples. The program code and a means for loading the program code to the computer, such as a storage medium containing a program code, constitute the present invention.

The storage media for storing the program code include floppy disk, hard disk, optical disk, magnetooptical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

According to the respective embodiments of the present invention described above, in a system in which the information processing apparatus as a host sends a print job to a printing apparatus to control a printing operation of the printing apparatus, in the case that the print data to be transmitted to the printing apparatus is in the form of binary data that is used as is by the printing apparatus, the configuration described above allows the information processing apparatus, when preparing the print job, to require the printing apparatus to send the calibration information to the information processing apparatus and correct the print data based on the calibration information obtained, thus making it possible for the host to automatically perform the correction based on the calibration information at generating the print job.

As a result, efficient and precise correction processing can be carried out without the user having to spend a considerable time performing the calibration information-based correction.

While in the foregoing embodiment, the print data has been described to be sent from the host to the printer in the form of binary data, the present invention is not limited to this configuration. The present invention may be applied, for example, to a configuration that the printer driver of the host generates multi-valued print data, such as 3-valued or 4-valued print data, according to the output form of the printer, to send the print data. In this case, when an electrophotographic printer using a laser beam is employed, for example, the output of the laser may be controlled at several levels to perform 3 or more-value printing. In a so-called bubble jet printer in which a bubble is generated in ink by a heater to eject an ink droplet, the amount of ink ejected can be controlled at a plurality of levels by activating a desired combination out of a plurality of heaters for one ejection opening, thus enabling multivalued printing. Further, in an ink jet printer, a plurality of kinds of ink of the same color with different densities can be used to perform multivalued printing.

The present invention has been described in detail with respect to preferred embodiments, and it will now be apparent from the foregoing to those skilled in the art that changes and modifications may be made without departing from the invention, therefore, in the apparent claims to cover all such changes and modifications as fall within the true spirit of the invention.

What is claimed is:

1. An information processing apparatus that is connectable to a printing apparatus in a way that allows a bidirectional communication, said information processing apparatus comprising:
   determining means for, when a request for printing in a print mode is made, determining whether or not the print mode of the request is a print mode in which print data is changed into binary data; and
   printing control means for,
      when said determining means determines that the print mode is the mode in which print data is changed into binary data, requesting the printing apparatus to send calibration information, in order to obtain the calibration information from the printing apparatus, generating a print job in which print data is corrected based on the obtained calibration information, and transferring the print job to the printing apparatus, and,
      when said determining means determines that the print mode is not the mode in which print data is changed into binary data, generating a print job in which print data is in a PDL format, and transferring the print job to the printing apparatus.

2. An information processing apparatus as claimed in claim 1, wherein said printing control means performs a function enabled by executing a single program.

3. An information processing apparatus as claimed in claim 2, wherein
   said printing control means performs a function enabled by executing a first program and a second program, which is activated by execution of the first program, and
   the second program includes processing for requesting the printing apparatus to send the calibration information, in order to obtain the calibration information.

4. An information processing apparatus as claimed in claim 3, wherein the second program includes processing for requesting and obtaining the calibration information at predetermined intervals, independently of execution of the first program.

5. An information processing apparatus as claimed in claim 3, wherein the second program includes processing for requesting and obtaining the calibration information in response to a request from the first program.

6. An information processing apparatus as claimed in claim 3, wherein the first program includes processing for generating a print job in which the print data is corrected based on the calibration information and transferring the generated print data to the printing apparatus, and further includes processing for, prior to generation and transfer of the print job to the printing apparatus, requesting the second program to obtain the calibration information from the printing apparatus and, after the calibration information is obtained, generating and transferring the print job to the printing apparatus.

7. An information processing apparatus as claimed in claim 6, wherein the first program includes processing for deciding whether or not printing is canceled and, when it is decided that the printing is canceled, terminating the processing for generating a print job.

8. A printing control method used in an information processing apparatus that is connectable to a printing apparatus in a way that allows a bidirectional communication, said printing control method comprising:
   a determination step of, when a request for printing in a print mode is made, determining whether or not the print mode of the request is a print mode in which print data is changed into binary data; and
   a print control step of,
      when it is determined in said determination step that the print mode is the mode in which print data is changed into binary data, requesting the printing apparatus to send calibration information, in order to obtain the calibration information from the printing apparatus, generating a print job in which print data is corrected based on the obtained calibration information, and transferring the print job to the printing apparatus, and
      when it is determined in said determination step that the print mode is not the mode in which print data is changed into binary data, generating a print job in which print data is in a PDL format, and transferring the print job to the printing apparatus.

9. A printing control method as claimed in claim 8, wherein said printing control step performs a function enabled by executing a single program.

10. A printing control method as claimed in claim 9, wherein
    said printing control step performs a function enabled by executing a first program and a second program, which is activated by execution of the first program, and
    the second program includes processing for requesting the printing apparatus to send the calibration information, in order to obtain the calibration information.

11. A printing control method as claimed in claim 10, wherein the second program includes processing for requesting and obtaining the calibration information at predetermined intervals, independently of execution of the first program.

12. A printing control method as claimed in claim 10, wherein the second program includes processing for requesting and obtaining the calibration information in response to a request from the first program.

13. A printing control method as claimed in claim 10, wherein the first program includes processing for generating a print job in which the print data is corrected based on the calibration information and transferring the generated print job to the printing apparatus, and further includes processing for, prior to generation and transfer of the print job to the printing apparatus, requesting the second program to obtain the calibration information from the printing apparatus and, after the calibration information is obtained, generating and transferring the print job to the printing apparatus.

14. A printing control method as claimed in claim 13, wherein the first program includes processing for deciding whether or not printing is canceled and, when it is decided that the printing is canceled, terminating the processing for generating a print job.

15. A storage medium storing a computer program for implementing a printing control method in an information processing apparatus that is connectable to a printing apparatus in a way that allows a bidirectional communication, the method comprising:
    a determination step of, when a request for printing in a print mode is made, determining whether or not the print mode of the request is a print mode in which print data is changed into binary data; and
    a print control step of,
       when it is determined in said determination step that the print mode is the mode in which print data is changed into binary data, requesting the printing apparatus to send calibration information, in order to obtain the calibration information from the printing apparatus, generating a print job in which print data is corrected based on the obtained calibration information, and transferring the print job to the printing apparatus, and when it is determined in said determination step that the print mode is not the mode in which print data is changed into binary data, generating a print job in which print data is in a PDL format, and transferring the print job to the printing apparatus.

* * * * *